United States Patent Office 3,391,209
Patented July 2, 1968

3,391,209
DI(ω-ALKENYL)METHYLCYCLOPENTANES
Erich Marcus, Charleston, W. Va., assignor to Union Carbide Corporation, a corporation of New York
No Drawing. Original application Dec. 28, 1962, Ser. No. 247,838, now Patent No. 3,356,704, dated Dec. 5, 1967. Divided and this application Mar. 20, 1967, Ser. No. 624,225
8 Claims. (Cl. 260—666)

ABSTRACT OF THE DISCLOSURE

This invention relates to the production of a member selected from the group consisting of (a) dimethylenemethylcyclopentane of the formula:

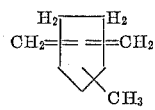

wherein the double bonds are attached to single carbon atoms of the cyclopentane nucleus, and (b) di(ω-alkenyl)methylcyclopentane of the formulas:

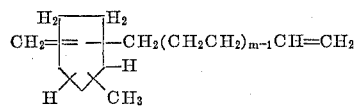

and

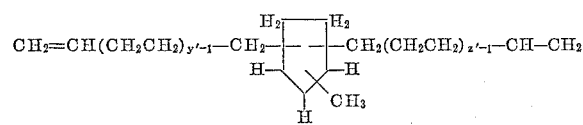

wherein $m$, $y'$ and $z'$ designate integers of from 1 to 8, and wherein the double bond attached directly to the cyclopentane nucleus is attached to a single carbon atom thereof, by reacting 1,3-butadiene with an isoalkylaluminum, optionally growing the resulting polymer with ethylene, and reacting the resulting polymer with ethylene in the presence of an aluminum displacement catalyst.

---

This application is a division of copending application Ser. No. 247,838, entitled, Dialiphatic-Substituted Methylcyclopentanes, filed Dec. 28, 1962, now U.S. Patent No. 3,356,704 issued Dec. 5, 1967.

The present invention is concerned with a novel process for the production of dialiphatic-substituted methylcyclopentanes, including polymeric organoaluminum compounds, utilizing 1,3-butadiene and an isoalkylaluminum as initial reactants. The invention is also concerned with certain of the dialiphatic-substituted methylcyclopentanes, particularly, the polymeric organoaluminum compounds and the higher molecular weight dienes, mono- and diepoxides, and diols hereinbelow described, as novel and useful compositions of matter.

In accordance with this invention, 1,3-butadiene is initially reacted with an isoalkylaluminum to form a novel polymer composed of a substantial proportion of recurring di(aluminomethyl)methylcyclopentane units, viz. up to about 35 percent or slightly more of such units based upon the total number of recurring units in the polymer. This reaction, in which two moles of 1,3-butadiene concurrently (i.e. in one procedural step) cyclize and displace an isoalkyl radical on each of two moles of the isoalkylaluminum to form a polymer composed of recurring di(aluminomethyl)methylcyclopentane units can be represented by the partial equation:

I
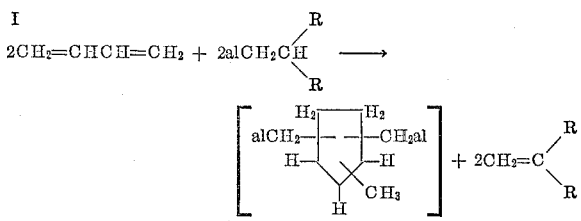

wherein each R, independently, designates an alkyl radical, preferably containing from 1 to 4 carbon atoms.

It is to be noted that, as herein employed, the symbol "al" designates one-third of an atom of aluminum. Thus, in all instances, each aluminum atom is attached to three other atoms. It is also to be noted that the recurring di(aluminomethyl)methylcyclopentane units of the polymer may comprise an isomeric mixture of 1,2-di(aluminomethyl)-3-methylcyclopentane and 1,3-di(aluminomethyl)-2-methylcyclopentane units, the latter generally predominating in the polymer. In addition, the polymer also contains recurring linear or branched-chain dialuminoalkane units, as well as various terminal units.

It was unexpected that a polymer comprised of a substantial proportion of recurring di(aluminomethyl)methylcyclopentane units could be obtained by the reaction of 1,3-butadiene and an isoalkylaluminum in one procedural step, since such reactants have heretofore been known to produce only an acyclic dialuminoalkane polymer via a plurality of procedural steps. Moreover, through subsequent reaction of the di(aluminomethyl)methylcyclopentane-containing polymer as hereinafter described, a novel route to various dialiphatic-substituted methylcyclopentanes has now been provided.

Several process conditions have been found to be of importance to the production of the di(aluminomethyl)methylcyclopentane-containing polymer in accordance with this invention. First of all, 1,3-butadiene must be brought into contact and admixed with an excess over the stoichiometric amount of isoalkylaluminum required for the reaction so as to assure a substantial degree of cyclization and the production of the polymer in one procedural step. In addition, for similar reasons, the amount of isoalkylaluminum employed must be sufficient to provide such excess in the reaction zone at all times during the reaction. Thus, an excess over one-third of a mole of isoalkylaluminum, and preferably at least about one mole of isoalkylaluminum, per mole of 1,3-butadiene is employed and maintained in the reaction zone during the reaction, In practice for instance, gaseous 1,3-butadiene can be bubbled slowly through excess liquid isoalkylaluminum. Alternatively, the reaction can be carried out continuously in a tubular reactor if a several fold excess of isoalkylaluminum is employed.

It has also been found expedient, during the course of the reaction, to remove the isoolefin formed as a byproduct. At the same time, it is preferable to remove unreacted 1,3-butadiene. Concordant therewith, the reaction can be carried out in an open system under atmospheric pressure or in a closed system under autogeneous pressure providing the system is equipped, in the latter instance, with means for venting or removing byproduct isoolefin, and preferably unreacted 1,3-butadiene, during the course of the reaction. The removal of byproduct isoolefin in this manner serves to drive the reaction to completion and minimizes or eliminates side reactions between the isoolefin and the growing polymer. At the same time, by the removal of unreacted 1,3-butadiene, the essential presence of excess isoalkylaluminum in the reaction zone is assured, and the possible formation of a thermal dimer of 1,3-butadiene which would contaminate the desired polymer is obviated.

The isoalkylaluminums which can be reacted with 1,3-butadiene as contemplated by this invention are the triisoalkylaluminums and diisoalkylaluminum hydrides represented by the formulae:

II

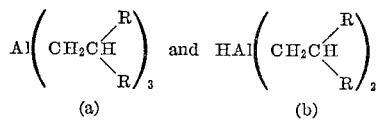

wherein R is as defined above. The size of the isoalkyl radical is limited only in that the corresponding isoolefin formed as a by-product must be readily removable from the reaction mixture during the course of the reaction, preferably as a gas. Suitable isoalkylaluminums include, by way of illustration, triisobutylaluminum, tri-2-methylbutylaluminum, tri-2-ethylhexylaluminum, diisobutylaluminum hydride, di-2-methylbutylaluminum hydride, di-2-ethylhexylaluminum hydride, and the like. The preferred isoalkylaluminum is triisobutylaluminum. Isoalkylaluminum containing two or three different isoalkyl radicals can also be employed as a reactant.

An inert organic solvent can also be incorporated in the reaction mixture, if desired. Suitable solvents include, for instance, heptane, octane, decane, benzene, toluene, xylene, Decalin, and the like.

The reaction temperature can vary broadly in the range of from about 80° C. to about 150° C., substantially lower temperatures engendering an excessively slow rate of reaction, while at higher temperatures, undesirable side reactions may occur. Preferably, a reaction temperature of from about 90° C. to about 130° C. is employed. At such temperatures, the reaction is generally carried out for a period of from about 5 to about 50 hours. However, longer or shorter reaction periods sufficient to produce the desired polymer can also be employed.

The polymer thus obtained is ordinarily solid at room temperature, changing to a viscous liquid at elevated temperatures, and can be separated from excess isoalkylaluminum and any solvent present in any convenient manner. For instance, the polymer can be recovered as the residue product obtained upon removal of the more volatile components of the reaction mixture by distillation or evaporation, etc.

In another aspect of this invention, when a polymer containing recurring di(aluminoalkyl)methylcyclopentane units of higher molecular weight, i.e. of increased aluminoalkyl chain length, is desired, the polymer, obtained as described above, is subsequently subjected to a "growth" process by reaction with ethylene in the absence of a catalyst, and preferably under pressure. This reaction, in which a novel polymer composed of a substantially equal proportion of recurring di(aluminoalkyl)methylcyclopentane units as compared with that of its polymeric precursor is produced, can be represented by the partial equation:

III

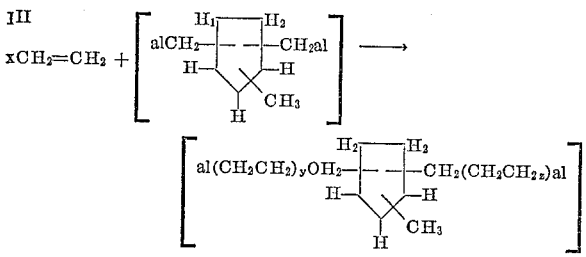

wherein y and z designate integers of from zero to a positive value, at least one of which must be a positive value as a consequence of the reaction with ethylene; the sum of y plus z being equal to x, the number of moles of ethylene added per recurring unit of the polymer. Thus, in the "growth" process, ethylene units are inserted between aluminum atoms and adjacent carbon atoms. A similar "growth" process also occurs in other recurring units present in the polymer, as well as in terminal units. In addition, the "grown" polymer will contain a minor amount of units which have not reacted with ethylene.

The amount of ethylene reacted should be sufficient to effect the "growth" of the recurring units of the polymer to the extent desired, as determined, for instance, by the subsequent use of the "grown" polymer. Useful polymers, by way of illustration, are those in which the aminoalkyl chain length of the recurring di(aluminoalkyl)methylcyclopentane units have "grown" by a statistically varying length of from 2, and perferably from 6 to about 32 carbon atoms, i.e. wherein y and z in each recurring unit designate integers having a value of from zero to about 8, at least one of which has a positive value, the sum which is preferably a value of at least 3. To this end, the polymer for which "growth" is desired is reacted with ethylene in a proportion of at least 1.5 moles, and preferably from about 4.5 moles, to about 24 moles of ethylene per atom of aluminum present in the polymer or per mole of isoalkylaluminum initially reacted to produce the polymer. In practice, however, an excess over the required amount of ethylene is generally charged. If desired, an inert organic solvent such as those described above in connection with the initial polymer formation can also be incorporated in the reaction mixture.

The reaction temperature for the "growth" process can vary broadly in the range of from about 80° C. to about 190° C., substantially lower temperatures engendering an excessively slow rate of reaction, while at higher temperatures, undesirable side reactions may occur. Preferably, a reaction temperature of from about 85° C. to about 120° C. is employed, particularly in connection with a batch operation. At such temperatures, the reaction is generally carried out for a period of from about 5 to about 50 hours. However, longer or shorter reaction periods consistent with the production of the "grown" polymer can also be employed. Thus, for instance, the reaction can also be carried out continuously in a tubular reactor at a temperature preferably of from about 120° C. to about 190° C. for very short contact periods. The amount of ethylene entering the polymer can be controlled in part by the control of temperature, reaction period, etc. and is readily determinable by one skilled in the art in light of this disclosure.

After the desired amount of ethylene has been incorporated in the polymer, as determined, for instance, by the moles of ethylene consumed, the system is vented so as to remove any excess ethylene. The "grown" polymer thus obtained, like its polymeric precursor, is ordinarily solid at room temperature, changing to a viscous liquid at elevated temperatures, and can be separated from any solvent present in any convenient manner, as, for instance, by the techniques described above in connection with the recovery of the "ungrown" polymer.

In still another aspect of this invention, the polymeric products hereinabove described are subjected to a "displacement" process by subsequent reaction with ethylene in the presence of a catalyst, and preferably under pressure, to form a useful class of dienes, viz. di(ω-alkenyl)methylcyclopentanes. In one embodiment of this aspect of the invention, when using an "ungrown" polymer, i.e. the polymer obtained in accordance with Equation I, the catalyzed reaction with ethylene can be represented by the partial equation:

IV

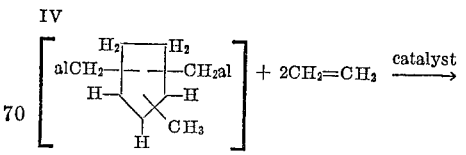

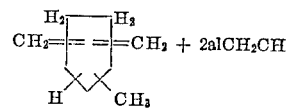

wherein the double bonds of the methylene radicals are attached to single carbon atoms of the cyclopentane nucleus. Similarly, the catalyzed reaction of ethylene with the "grown" polymer obtained in accordance with Equation III can be represented by the partial equation:

V

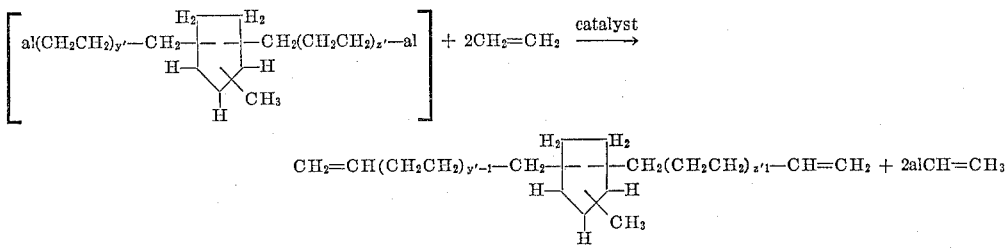

wherein $y'$ an $z'$ are each positive values within the meaning hereinabove defined by $y$ and $z$. Alternatively, when the "grown" polymer is such that $y$ or $z$ is zero, the catalyzed reaction with ethylene can be represented by the partial equation:

VI

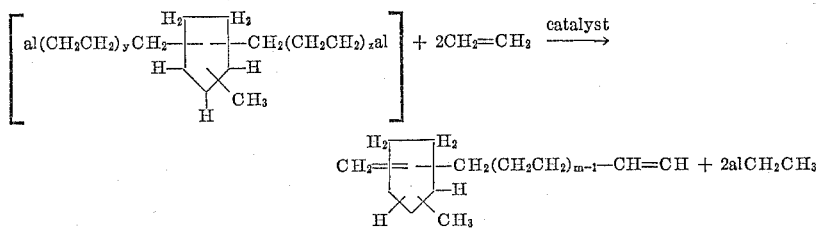

wherein the double bond attached directly to the cyclopentane nucleus is attached to a single carbon atom thereof, and $m$ designates a positive integar equal to the positive value of $y$ or $z$. A similar "displacement" process also occurs in other recurring units present in the polymer as well as in terminal units.

In the "displacement" process, the polymer is reacted with ethylene in a proportion of at least 3 *moles of ethylene per atom of aluminum* present in the polymer. In practice, however, an excess over the required amount of ethylene is generally charged. If desired, an inert organic solvent such as those described above in connection with the initial polymer formation can also be incorporated in the reaction mixture. In addition, the presence of a small amount of an acetylenic compound, such as phenylacetylene, has been found to prolong the life of the catalyst employed and to minimize the migration of double bonds in the diene product.

Suitable catalysts for use in the "displacement" process include nickel, cobalt and platinum. Such metals can be incorporated in the reaction mixture in elemental form or, preferably, as an inorganic or organic salt such as nickel chloride, platinum chloride, cobalt chloride, nickel acetylacetonate, platinum acetylacetonate, cobalt acetylacetonate, and the like. The use of such salts ordinarily engenders a better dispersion of the metal in the reaction mixture. The catalyst is generally employed in a concentration of from about 0.0001 to about 1 percent by weight of metal based upon the weight of the polymer undergoing reaction, although higher or lower catalytic amounts can also be used. Preferably, the catalyst is employed in a concentration of from about 0.005 to about 0.1 percent by weight based in like manner.

The reaction temperature for the "displacement" process can vary broadly in the range of from about 25° C. to about 120° C., particularly in connection with a batch operation. Here again, substantially lower temperatures engender an excessively slow reaction rate, while at higher temperatures, in the presence of the catalyst, undesirable side reactions may occur. The preferred reaction temperature is from about 40° C. to about 70° C. At such temperatures the reaction is generally carried out for a period of from about 1 to about 24 hours. However, longer or shorter reaction periods consistent with diene formation can also be employed.

The "displacement" process can also be conducted omitting the use of a catalyst at substantially higher reaction temperatures of from about 250° C. to about 350° C., or slightly higher, and preferably from about 280° C. to about 320° C. At such higher temperatures, the reaction is best carried out continuously in a tubular reactor for short contact periods.

The diene product thus obtained is ordinarily liquid in form at room temperature, and can be recovered from the reaction mixture in any convenient manner. Preferably, upon completion of the "displacement" process, the reaction mixture is hydrolyzed to assist the removal of alkylaluminum formed as a by-product. Hydrolysis can be effected by reaction with water, aqueous alcohol, and/or dilute acid. Upon hydrolysis, aluminum hydroxide is formed. The diene product can then be recovered by distillation of the organic phase of the reaction mixture. The removal of by-product alkylaluminum in this manner prevents the reversal of the "displacement" process which might otherwise occur upon distillation of the diene product.

Due to the nature of the polymer employed as precursors, the diene product may comprise an isomeric mixture of 1,2-di-($\omega$-alkenyl)-3-methylcyclopentanes and 1,3-di($\omega$-alkenyl)-2-methylcyclopentanes of statistically varying molecular weight (alkenyl chain length), the latter generally predominating in the product especially in the 1,trans-2, cis-3 form. In addition, $\alpha,\omega$-alkadienes of statistically varying molecular weight are also produced. Such mixture can be resolved into components of narrow carbon content ranges by fractional distillation and the products analyzed by gas-chromatography.

Of the dienes produced in accordance with this invention, there can be mentioned:

1,3-dimethylene-2-methylcyclopentane,
1,2-dimethylene-3-methylcyclopentane,
1-methylene-3-(2-propenyl)-2-methylcyclopentane,
1-methylene-3-(4-pentenyl)-2-methylcyclopentane,
1-methylene-3-(6-heptenyl)-2-methylcyclopentane,
1-methylene-3-(8-nonenyl)-3-methylcyclopentane,
1-methylene-2-(8-nonenyl)-3-methylcyclopentane,
1,3-di(2-propenyl)-2-methylcyclopentane,
1,2-di(2-propenyl)-3-methylcyclopentane,
1-(2-propenyl)-3-(4-pentenyl)-2-methylcyclopentane,
1-(2-propenyl)-3-(6-heptenyl)-2-methylcyclopentane, 1-(2-propenyl)-3-(8-nonenyl)-2-methylcyclopentane,
1-(4-pentenyl)-3-(8-nonenyl)-2-methylcyclopentane,
1,3-di(6-heptenyl)-2-methylcyclopentane,
1-(4-pentenyl)-3-(16-heptadecenyl)-2-methylcyclo-
  pentane, and the like. The higher molecular weight dienes containing from 14 to about 40 carbon atoms are contemplated as novel compositions of matter.

The dienes can subsequently be polymerized in accordance with conventional processes for the polymerization of olefinically unsaturated compounds to produce useful polymers. The dienes can also be reacted in accordance with conventional processes for the epoxidation of olefinically unsaturated compounds to produce the vicinal mono- and diepoxides represented by the formulas:

VII 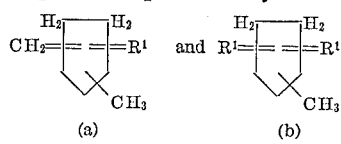

(a)     (b)

wherein $R^1$ designates a methyleneoxy, i.e.

radical attached to a single carbon atom of the cyclopentane nucleus;

VIII 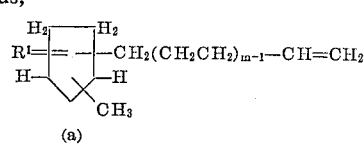

(a)

and

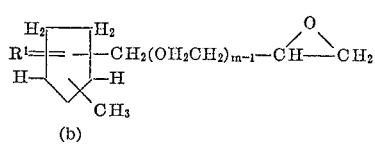

(b)

wherein R' and m are as defined above; and

IX

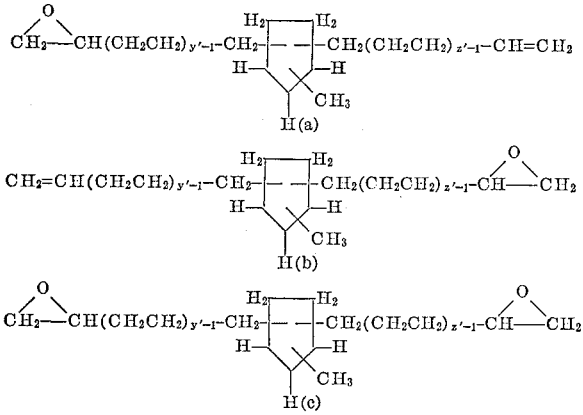

wherein y' and z' are as defined above. The specific structure of the epoxide product will depend upon the diene employed as a precursor. For instance, the epoxides represented by Formulas VII(a) and (b) are derived from the dienes obtained in accordance with Eqution IV; the epoxides represented by Formulas VIII(a) and (b) are derived from the dienes obtained in accordance with Equation VI; and the epoxides represented by Formulas IX(a) to (c) are derived from the dienes obtained in accordance with Equation V. The formation of a mono- or diepoxide will depend for the most part upon the amount of epoxidizing agent employed, and is readily determinable by one skilled in the art in light of this disclosure. It is to be noted that the reaction of the diene obtained in accordance with Equation VI with an amount of epoxidizing agent sufficient to produce a monoepoxide will generally result in the selective epoxidation of the bare methylene radical attached to the cyclopentane nucleus rather than the higher ω-alkyl radical. On the other hand, the reaction of the diene obtained in accordance with Equation V with an amount of epoxidizing agent sufficient to produce a monoepoxide may result in the production of an isomeric mixture of the epoxides represented by the Formulas IX(a) and (b). Mixtures of mono- and diepoxides may also be produced depending, for instance, upon the amount of epoxidizing agent employed.

The epoxidation of the dienes can be carried out by reaction with peracetic acid or other conventional epoxidizing agent, in a suitable solvent such as ethyl acetate, if desired, and at a temperature which can vary broadly in the range of from about −25° C. to about 150° C. Preferably, reaction temperatures of from 10° C. to about 90° C. are employed. At such temperatures, a reaction period of from about 1 to about 10 hours is usually sufficient for a complete reaction. However, longer or shorter reaction periods consistent with epoxide formation can also be employed.

The epoxide product can then be recovered from the reaction mixture in any convenient manner. For instance, the epoxide product can be recovered as the residue obtained upon removal of the more volatile components of the reaction mixture by distillation or evaporation and resolved, if desired, by further distillation when more than one epoxide is produced.

As typical of the epoxides produced in accordance with this invention, there can be mentioned:

1-methyleneoxy-3-methylene-2-methylcyclopentane,
1,3-dimethyleneoxy-2-methylcyclopentane,
1,2-dimethyleneoxy-3-methylcyclopentane,
1-methyleneoxy-3-(4-pentenyl)-2-methylcyclopentane,
1-methyleneoxy-3-(4,5-epoxypentyl)-2-methylcyclo-
  pentane,
1-methyleneoxy-3-(6-heptenyl)-2-methylcyclopentane,
1-methyleneoxy-3-(6,7-epoxyheptyl)-2-methylcyclo-
  pentane,
1-methyleneoxy-3-(8-nonenyl)-2-methylcyclopentane,
1-methyleneoxy-3-(8,9-epoxynonyl)-2-methylcyclo-
  pentane,
1-methyleneoxy-2-(8,9-epoxynonyl)-3-methylcyclo-
  pentane,
1-(2-propenyl)-3-(2,3-epoxypropyl)-2-methylcyclo-
  pentane,
1,3-di(2,3-epoxypropyl)-2-methylcyclopentane,
1,2-di(2,3-epoxypropyl)-2-methylcyclopentane,
1-(2-propenyl)-3-(4,5-epoxypentyl)-2-methylcyclo-
  pentane,
1-(2,3-epoxypropyl)-3-(4-pentenyl)-2-methylcyclo-
  pentane,
1-(2,3-epoxypropyl)-3-(4,5-epoxypentyl)-2-methylcyclo-
  pentane,
1-(2-propenyl)-3-(8,9-epoxynonyl)-2-methylcyclo-
  pentane,
1-(2,3-epoxypropyl)-3-(8-nonenyl)-2-methylcyclo-
  pentane,
1-(2-propenyl)-3-(8,9-epoxynonyl)-2-methylcyclo-
  pentane,
1-(2,3-epoxypropyl)-3-(8,9-epoxynonyl)-2-methylcyclo-
  pentane,
1-(6-heptenyl)-3-(6,7-epoxyheptyl)-2-methylcyclo-
  pentane,
1,3-di(6,7-epoxyheptyl)-2-methylcyclopentane,
1-(4,5-epoxypentyl)-3-(16,17-epoxyheptadecyl)-2-
  methylcyclopentane, and the like. The higher molecular weight epoxides, and particularly the diepoxides, containing from 14 to about 40 carbon atoms are contemplated as novel compositions of matter.

The epoxides produced in accordance with this invention can be homopolymerized or reacted with organic hardeners such as polycarboxylic acids or anhydrides, polyamines, or polyols to produce curable resins having a wide variety of uses, particularly as molded articles. The resins thus obtained from the novel epoxides of this invention, and particularly the diepoxides, may be characterized by enhanced impact strength and thermal shock resistance. The novel diepoxides of this invention are also suited for use as plasticizers for vinyl resins. The novel monoepoxides of this invention, on the other hand, can be copolymerized with conventional vinyl monomers to produce resins having enhanced heat and/or light stability.

In a further aspect of this invention, the polymers obtained in accordance with Equations I and III are converted to novel and useful diols, viz. di($\omega$-hydroxyalkyl)methylcyclopentanes represented by the formula:

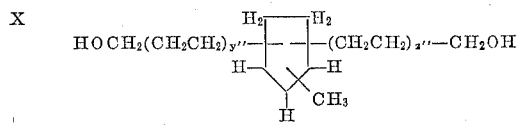

wherein $y''$ and $z''$ independently designate integers of from 0 to 8. The specific structure of the diols will depend upon the polymer employed as a precursor. Thus, the diols represented by Formula X wherein $y''$ and $z''$ each designate zero are derived from the polymer obtained as described above in accordance with Equation I; while the diols represented by Formula X wherein $y''$ and/or $z''$ designate a positive integer are derived from the "grown" polymer obtained as described above in connection with Equation III, with $y''$ and $z''$ being equal to $y$ and $z$, respectively.

The conversion of the polymer to a diol can be carried out by contacting the polymer at a temperature maintained in the range from about 0° C. to about 150° C., and preferably from about 30° C. to about 60° C., with oxygen so as to insert an oxygen atom between each aluminum atom of the polymer and the adjacent carbon atom. Such contact can be effected, for instance, by passing dry air or a nitrogen-oxygen mixture into a reaction mixture containing the polymer. Since the reaction is exothermic, it is desirable in some instances to use a low concentration of oxygen at the beginning of the reaction and thereafter increase the oxygen concentration in the reactant gas stream as the rate of reaction decreases. Near the end of the reaction, pure oxygen can be used to insure completion. If desired, an inert organic solvent such as those described above in connection with the initial polymer formation can also be incorporated in the reaction mixture.

After the oxygenation step, water or dilute acid is added to the reaction mixture to convert the oxygenated polymer to the diol. Water is preferred, as it readily hydrolyzes the polymer, forming the diol and aluminum hydroxide as a by-product. Alternatively, the oxygenated polymer can be hydrolyzed to produce the desired diol by reaction with aqueous alcohol.

The diols thus obtained can be recovered from the reaction mixture in any convenient manner, as, for instance, by distillation of the organic phase of the reaction mixture, etc. Moreover, due to the nature of the polymers employed as precursors, the diol product may comprise an isomeric mixture of 1,2-di($\omega$-hydroxyalkyl)-3-methylcyclopentanes and 1,3-di($\omega$-hydroxyalkyl)-2-methylcyclopentanes of statistically varying molecular weight (hydroxyalkyl chain length), the latter generally predominating in the product especially in the 1, trans-2, cis-3 form. In addition, $\alpha,\omega$-alkanediols of varying molecular weight are also produced. Such mixture can be resolved into components of narrow carbon content ranges by fractional distillation and the products analyzed by gas chromatography. As typical of the diols produced in accordance with this invention, there can be mentioned:

1,3-di(hydroxymethyl)-2-methylcyclopentane,
1,2-di(hydroxymethyl)-3-methylcyclopentane,
1-hydroxymethyl-3-(3-hydroxypropyl)-2-methylcyclopentane,
1-hydroxymethyl-3-(5-hydroxypentyl)-2-methylcyclopentane,
1-hydroxymethyl-3-(7-hydroxyheptyl)-2-methylcyclopentane,
1-hydroxymethyl-3-(9-hydroxynonyl)-2-methylcyclopentane,
1-hydroxymethyl-2-(9-hydroxynonyl)-3-methylcyclopentane,
1,3-di(3-hydroxypropyl)-2-methylcyclopentane,
1,2-di(2-hydroxypropyl)-3-(5-hydroxypentyl)-2-methylcyclopentane,
1-(3-hydroxypropyl)-3-(7-hydroxyheptyl)-2-methylcyclopentane,
1-(3-hydroxypropyl)-3-(9-hydroxynonyl)-2-methylcyclopentane,
1-(5-hydroxypentyl)-3-(9-hydroxynonyl)-2-methylcyclopentane,
1,3-di(7-hydroxyheptyl)-2-methylcyclopentane,
1-(5-hydroxypentyl)-3-(17-hydroxyheptadecyl)-2-methylcyclopentane and the like. The higher molecular weight diols, containing from 14 to about 40 carbon atoms are contemplated as novel compositions of matter.

The diols produced in accordance with this invention can be employed as organic hardeners by reaction with epoxides, such as 3,4-epoxy-6-methylcyclohexylmethyl 3,4-epoxy-6-methylcyclohexanecarboxylate and the like, in conventional manner to produce curable resins having a wide variety of uses, particularly as molded articles. The resins thus produced from the novel diols of this invention may be characterized by enhanced impact strength and thermal shock resistance.

The polymers obtained in accordance with Equations I and III can also be hydrolyzed by reaction with aqueous alcohol and/or dilute acid to form trialkylcyclopentanes represented by the formula:

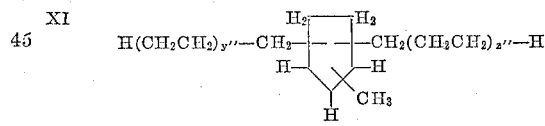

wherein $y''$ and $z''$ are as defined above. The trialkylcyclopentanes thus produced can be recovered from the reaction mixture in any convenient manner, as, for instance, by distillation of the organic phase of the reaction mixture, etc. Moreover, due to the nature of the polymers employed as precursors, the hydrolyzed product may comprise an isomeric mixture of 1,2,3-trialkylcyclopentanes of statistically varying molecular weight (alkyl chain length). In addition, linear or branched-chain alkanes of statistically varying molecular weight are also produced. Such mixture can be resolved into components of narrow carbon content range by fractional distillation and the products analyzed by gas chromatography. The trialkylcyclopentanes can also be obtained by the reaction with hydrogen of the di($\omega$-alkenyl)methylcyclopentanes represented above by Formulas VI to VIII in accordance with conventional processes for the hydrogenation of olefinically unsaturated compounds.

The invention, in its various aspects, can be illustrated further by the following examples:

Example I

In a one-liter flask equipped with a stirrer, condenser, thermometer, inlet tube, and attachment to wet- and Dry-Ice traps, gaseous 1,3-butadiene was slowly bubbled through 160 grams of liquid triisobutylaluminum over a period of 28 hours at a temperature maintained in the range of from 110° C. to 120° C. During the course of the ensuing reaction, 126 grams of isobutylene, formed as a by-product, and 410 grams of unreacted 1,3-butadiene which had bubbled through the liquid triisobutylaluminum were removed. A polymer comprised of a substantial proportion of recurring di(aluminomethyl)methylcyclopentane units was formed and found to be a viscous liquid at a temperature of 110° C. and a colorless solid at room temperature. The polymer was hydrolyzed by reaction with 300 milliliters of ethanol at a temperature of 80° C. Upon hydrolysis 20.2 grams of butane, 10.3 grams of isobutane, 2.3 grams of isobutylene, and 1 gram of butadiene were evolved and removed. Hydrolysis was thereafter continued by reaction with dilute hydrochloric acid at a temperature of 50° C. A two-phase reaction mixture comprising an upper organic layer and a lower aqueous layer was formed. The organic layer was separated, washed with water, dried over magnesium sulfate and filtered, thereby yielding 55 grams of mixed hydrocarbons. A 44-gram portion of this mixture was distilled to yield the following fractions:

| Fraction | Weight, grams | B.P. (° C.) | $n_D^{30}$ | $d_{25}^{25}$ |
|---|---|---|---|---|
| 1 | 29 | 110–120 | 1.413 | 0.757 |
| 2 | 3 | 120/atm.–70/50 mm. Hg | 1.426 | 0.775 |
| 3 | 2 | 70/50 mm. Hg.–118/50 mm. Hg | 1.443 | 0.813 |
| 4 | 8 | 118/50 mm. Hg.–82/0.3 mm. Hg | 1.454 | 0.833 |
| Residue | 2 | | | |

The fractions were analyzed by gas chromatography. Fractions 1 and 2 were found to be composed in major part of trimethylcyclopentanes, particularly 1, trans-2, cis-3-trimethylcyclopentane, 1, cis-2, trans-3-trimethylcyclopentane, 1, cis-2, cis-3-trimethylcyclopentane in a total yield of approximately 30 grams, 1, trans-2, cis-3-trimethylcyclopentane being the significantly predominant product in fraction 1. In addition, minor amounts of other $C_8$ as well as $C_{12}$ and $C_{16}$ hydrocarbons were also found to be produced.

Example II

In a manner similar to that described above in Example I, 1,3-butadiene was reacted with triisobutylaluminum to produce 612 grams of a polymer comprised of a substantial proportion of recurring di(aluminomethyl)methylcyclopentane units. A mixture of 215 grams of this polymer, 350 grams of benzene, 0.3 ml. of phenylacetylene, and 0.1 ml. of nickel acetylacetonate was charged to a stainless steel bomb under a nitrogen atmosphere. Thereafter, 276 grams of ethylene were added to the mixture, and the bomb was closed and heated, accompanied by rocking, to a temperature of 71° C. within a period of 35 minutes. The pressure within the bomb at this point was 860 p.s.i. Heating was continued, accompanied by rocking, at a temperature maintained in the range of from 71° C. to 78° C. for a period of 21 hours, whereupon the pressure within the bomb had dropped to 420 p.s.i. at 75° C. The bomb was connected to two Dry Ice traps and vented at room temperature. In this manner, about 12 grams of benzene, 28 grams of butene, and 4 grams of butadiene were removed. The contents of the bomb, together with a benzene rinse, were transferred under a nitrogen atmosphere to a distillation flask. At a reduced pressure of 200 mm. of Hg, 6 grams of benzene, 65 grams of butene and 11 grams of butadiene were recovered by distillation. Similarly, 566 grams of distillate consisting of benzene and 38 grams of 1,2,3-dimethylenemethylcyclopentane, as determined by gas chromatography, were obtained upon reduction of the pressure to 3 mm. of Hg. Thereafter, a distillate containing 119 grams of substantially pure triethylaluminum was obtained at a temperature in the range of 65° C. to 78° C. under a reduced pressure in the range of 1 to 3 mm. of Hg. The 1,2,3-dimethylenemethylcyclopentane-containing distillate was washed with water and redistilled to yield 23 grams of purified dimethylenemethylcyclopentane (B.P. 118–121° C.), the remainder of the diene being distilled over with benzene. A major fraction of this product, viz. 12 grams, consisting of substantially pure 1,2,3-dimethylenemethylcyclopentane, had the following physical properties: B.P. 120–121° C., $n_D^{20}$ 1.4621, and $d_4^{20}$ 0.8172.

Analysis.—Calculated for $C_8H_{12}$: C, 88.82; H, 11.18; M.W., 108; $M_D$ (for pure 1,2,3-dimethylenemethylcyclopentane), 36.02. Found: C, 88.61; H, 11.41; M.W., 108; $M_D$, 36.40. Based upon molecular refractivity data, and ultraviolet and infrared analysis, the product is believed to consist of approximately 80 percent 1,3-dimethylene-2-methylcyclopentane and 20 percent 1,2-dimethylene-3-methylcyclopentane.

Three milliliters of the 1,2,3-dimethylenemethylcyclopentane product (B.P. 120–121° C.), upon dissolution in 3 ml. of ethanol and the addition of 2 drops of concentrated hydrochloric acid, were hydrogenated over platinum oxide in a Parr hydrogenator at 40 p.s.i. and room temperature for a period of about 1 hour. The pressure was 37.5 p.s.i. at the end of this period. The hydrogenated product was washed with water, dried over magnesium sulfate and analyzed by gas chromatography, infrared and mass spectroscopy. There were thus obtained as products, 1, trans-2, cis-3-trimethylcyclopentane, 1, cis-2, trans-3-trimethylcyclopentane, and 1, cis-2, cis-3-trimethylcyclopentane in quantitative yield.

Example III

In a manner similar to that described above in Example I, 1,3-butadiene was reacted with triisobutylaluminum to produce a polymer comprised of a substantial proportion of recurring di(aluminomethyl)methylcyclopentane units. A mixture of 169 grams of this polymer, and 150 grams of benzene was charged to a stainless steel bomb under a introgen atmosphere. Thereafter, 373 grams of ethylene were added to the mixture, and the bomb was closed and heated, accompanied by rocking, at a temperature maintained in the range of from 82° C. to 86° C. for a period of 21 hours. During this period, the pressure in the bomb dropped from an initial high of 1,375 p.s.i. to 1,025 p.s.i. An ethylenically "grown" polymer composed of a proportion of recurring di(aluminoalkyl)methylcyclopentane units substantially equal to the proportion of di(aluminomethyl)methylcyclopentane units in the polymeric precursor was formed. The "grown" polymer was hydrolyzed by reaction with ethanol, water, and dilute hydrochloric acid in a manner similar to that described above in Example I. A two-phase reaction mixture comprising an upper organic layer and a lower aqueous layer was formed. The organic layer was separated, washed with water, dried over magnesium sulfate and distilled to yield the following fractions:

| Fraction | Weight (grams) | B.P. (° C.) | $C_n$ range |
|---|---|---|---|
| 1 | 37 | 95–125 | $C_8$ |
| 2 | 3 | 125–157 | $C_8$–$C_{10}$ |
| 3 | 24 | 157–172 | $C_{10}$ |
| 4 | 8 | 172–184 | $C_{10}$ |
| 5 | 29 | 184–214 | $C_{12}$ |
| 6 | 23 | 123/50 mm. Hg–142/45 mm. Hg | $C_{12}$–$C_{14}$ |
| 7 | 24 | 142/45 mm. Hg–154/10 mm. Hg | $C_{14}$–$C_{16}$ |
| 8 | 30 | 154/10 mm. Hg–149/1 mm. Hg | $C_{16}$–$C_{18}$ |
| 9 | 15 | 149/1 mm. Hg–178/1.4 mm. Hg | $C_{18}$–$C_{20}$ |
| 10 | 10 | 178/1.4 mm. Hg–230/0.7. Hg | $C_{20}$–$C_{24}$ |
| Residue | 7 | | |

The fractions were analyzed by gas chromatography. The fractions were found to be composed of 1,2,3-($C_3$-, $C_5$-, $C_7$-, $C_9$-, $C_{11}$-, $C_{13}$-, $C_{15}$-, $C_{17}$-, and $C_{19}$-trialkyl)cyclopentanes, i.e. cyclopentanes containing three alkyl substituents possessing an aggregate sum of 3, 5, 7, 9, 11, 13, 15, 17, and 19 carbon atoms, at least one alkyl radical being a methyl radical, in a total yield of approximately 70 grams as follows:

| Product: | Weight (grams) |
|---|---|
| Trimethylcyclopentane | 8.1 |
| ($C_5$-alkyl)cyclopentane | 12.0 |
| ($C_7$-alkyl)cyclopentane | 10.8 |
| ($C_9$-alkyl)cyclopentane | 11.4 |
| ($C_{11}$-alkyl)cyclopentane | 14.7 |
| ($C_{13}$-alkyl)cyclopentane | 3.8 |
| ($C_{15}$-alkyl)cyclopentane | 4.9 |
| ($C_{17}$-alkyl)cyclopentane | 3.1 |
| ($C_{19}$-alkyl)cyclopentane | 0.6 |

Gas chromatographic analysis also indicated the production of acyclic hydrocarbons containing an even number of from 8 to 22 carbon atoms in a total yield of approximately 100 grams. A sample of 1,2,3-dimethylpropylcyclopentane obtained from the ($C_5$-alkyl)cyclopentane-containing fraction was further analyzed as follows:

Calculated for $C_{10}H_{20}$: C, 85.63; H, 14.37; M.W., 140.3. Found: C, 85.57; H, 14.62; M.W. 140.

A sample of 1,2,3-dimethylpentylcyclopentane obtained from the ($C_7$-alkyl)cyclopentane-containing fraction was further analyzed as follows:

Calculated for $C_{12}H_{24}$: C, 85.63; H, 14.37; M.W., 168.3. Found: C, 85.20; H, 14.35; M.W., 168. Infrared and nuclear magnetic resonance spectra were consistent therewith.

Example IV

An ethylenically "grown" polymer, dissolved in benzene, is obtained as described above in Example III. At a temperature of about 60° C. dry air is then passed through the reaction mixture, thereby oxygenating the polymer. Upon completion of the ensuing reaction, as evidenced by a cessation in the evolution of heat, water is added to the reaction mixture, accompanied by heating at a temperature of about 100° C. to hydrolyze the polymer. The precipitated aluminum hydroxide is removed by filtration. The filtrate is thereafter fractionally distilled. In this manner, 1,2,3-($C_3$-, $C_5$-, $C_7$, $C_9$-, $C_{11}$-, $C_{13}$-, $C_{19}$-di-[ω-hydroxyalkyl]methyl)cyclopentanes, i.e. cyclopentanes containing two ω-hydroxyalkyl and one methyl substituent possessing an aggregate sum of 3, 5, 7, 9, 11, 13, 17, and 19 carbon atoms, are obtained as products.

Example V

In a manner similar to that described above in Example I, 1,3-butadiene was reacted with triisobutylaluminum to produce a polymer comprised of a substantial proportion of recurring di(aluminomethyl)methylcyclopentane units. A mixture of 172 grams of this polymer and 150 grams of benzene was charged to a stainless steel bomb under a nitrogen atmosphere. Thereafter, 369 grams of ethylene were added to the mixture, and the bomb was closed and heated, accompanied by rocking, at a temperature maintained in the range of from 85° C. to 90° C. for a period of 48 hours. During this period, the pressure in the bomb dropped from an initial high of 1,200 p.s.i. to 830 p.s.i. An ethylenically "grown" polymer composed of a proportion of recurring di(aluminoalkyl)methylcyclopentane units substantially equal to the proportion of di(aluminomethyl)methylcyclopentane units in the polymer precursor was formed. The bomb was cooled and vented at room temperature. To the contents in the bomb, 270 grams of additional ethylene, 17 grams of benzene, and 0.2 gram of nickel acetylacetonate were added. The bomb was closed and reheated, accompanied by rocking at a temperature of about 68° C. for a period of 19 hours. The pressure, during this period, varied from an initial high of 625 p.s.i. to 525 p.s.i. A mixture of dienes and triethylaluminum was thus formed. The product was hydrolyzed by reaction with ethanol, water, and dilute hydrochloric acid in a manner similar to that described above in Example I. A two-phase reaction mixture comprising an upper organic layer and a lower aqueous layer was formed. The organic layer was separated, washed with water, dried over magnesium sulfate and distilled to yield the following fractions:

| Fraction | Weight (grams) | B.P. (° C.) | $C_n$ range |
|---|---|---|---|
| 1 | 6 | 50/200 mm. Hg–70/200 mm. Hg | $C_8$ |
| 2 | 30 | 70/200 mm. Hg–90/100 mm. Hg | $C_8$–$C_{10}$ |
| 3 | 12 | 90/100 mm. Hg–100/100 mm. Hg | $C_8$–$C_{10}$ |
| 4 | 19 | 100/100 mm. Hg–120/100 mm. Hg | $C_{10}$ |
| 5 | 28 | 120/100 mm. Hg–139/50 mm. Hg | $C_{10}$–$C_{12}$ |
| 6 | 34 | 139/50 mm. Hg–134/10 mm. Hg | $C_{12}$–$C_{14}$ |
| 7 | 40 | 134/10 mm. Hg–132/1.1 mm. Hg | $C_{16}$–$C_{18}$ |
| 8 | 36 | 132/1.1 mm. Hg–166/1.1 mm. Hg | $C_{16}$–$C_{20}$ |
| 9 | 26 | 166/1.1 mm. Hg–186/1.1 mm. Hg | $C_{22}$–$C_{24}$ |
| Residue | 20 | | |

The fractions were analyzed by gas chromatography. There were thus obtained as products 1,2,3-($C_3$-, $C_4$-, $C_9$-, $C_{11}$-, $C_{13}$-, $C_{15}$-, and $C_{19}$-di[ω-alkenyl]methyl)cyclopentanes, i.e., cyclopentanes containing two ω-alkenyl and one methyl substituent possessing an aggregate sum of 3, 5, 7, 9, 11, 13, 15, and 17 carbon atoms. Gas chromatographic analysis also indicated the production of α,ω-alkadienes containing an even number of from 8 to 20 carbon atoms. A sample of 1,2,3-alkylmethylmethylenecyclopentane obtained from fraction 3 was further analyzed as follows:

Calculated for $C_{10}H_{16}$: C, 88.16; H, 11.84; M.W., 136.3. Found: C, 88.43; H, 11.94; M.W., 136.

A sample of 1,2,3-methylmethylenepent-4-enylcyclopentane obtained from fraction 5 was confirmed in structure by mass and infrared spectroscopy. This product is subsequently converted to 1,2,3-methylmethyleneoxy(4,5-epoxypentyl)cyclopentane by admixing the diene, in ethyl acetate, with an excess over two moles of peracetic acid per mole of diene and heating the resulting mixture at a temperature of about 60° C. for several hours. In similar, the other di(ω-alkenyl)methylcyclopentanes produced as described above in this example are converted to the corresponding diepoxides by reaction with excess peracetic acid.

What is claimed is:

1. The process for the production dimethylenemethylcyclopentane of the formula:

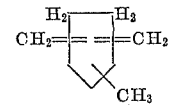

wherein the double bonds are attached to single carbon atoms of the cyclopentane nucleus, which process comprises the steps of (a) bringing 1,3-butadiene into reactive admixture with an isoalkylaluminum of the formula selected from the group:

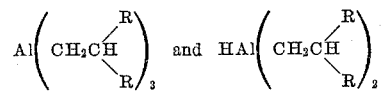

wherein each R, independently designates an alkyl radical of from 1 to 4 carbon atoms, at a temperature of from about 80° C. to about 150° C., in a proportion of isoalkylaluminum to 1,3-butadiene providing an excess over one-third mole of isoalkylaluminum per mole of 1,3-butadiene during the reaction, and while removing the isoolefin formed as a by-product from the resulting mixture, for a period of time sufficient to produce a polymer composed in substantial proportion of recurring units of the formula:

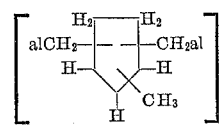

and (b) bringing said polymer into reactive admixture with at least 3 moles of ethylene per aluminum atom of said polymer, in contact with a catalytic amount of a metal catalyst selected from the group consisting of nickel, platinum and cobalt, at a temperature of from about 25°

C. to about 120° C., for a period of time sufficient to produce said dimethylenemethylcyclopentane.

2. The process for the production dimethylenemethylcyclopentane of the formula:

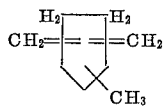

wherein the double bonds are attached to single carbon atoms of the cyclopentane nucleus, which process comprises the steps of (a) reacting 1,3-butadiene into reactive admixture with an isoalkylaluminum of the formula selected from the group:

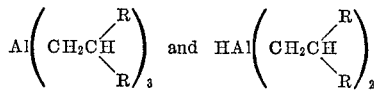

wherein each R, independently, designates an alkyl radical of from 1 to 4 carbon atoms, at a temperature of from about 90° C. to about 130° C., in a proportion of isoalkylaluminum to 1,3-butadiene providing an excess over one-third mole of isoalkylaluminum per mole of 1,3-butadiene during the reaction, and while removing the isoolefin formed as a by-product from the resulting mixture, for a period of time sufficient to produce a polymer composed in substantial proportion of recurring units of the formula

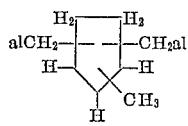

and (b) bringing said polymer into reactive admixture with at least 3 moles of ethylene per aluminum atom of said polymer in contact with a catalytic amount of nickel acetylacetonate, at a temperature of from about 40° C. to about 70° C., for a period of time sufficient to produce said dimethylenemethylcyclopentane.

3. The process according to claim 2 wherein said triisoalkylaluminum is triisobutylaluminum.

4. The process for the production of a di(ω-alkenyl)methylcyclopentane of the formula selected from the group:

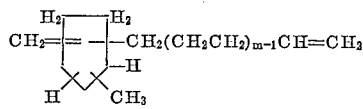
and
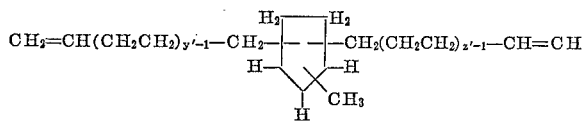

wherein m, y' and z' designate integers of from 1 to 8, and wherein the double bond attached directly to the cyclopentane nucleus is attached to a single carbon atom thereof, which process comprises the steps of (a) bringing 1,3-butadiene into reactive admixture with an isoalkylaluminum of the formula selected from the group:

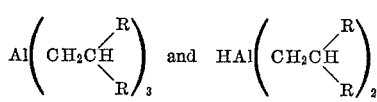

wherein each R, independently, designates an alkyl radical of from 1 to 4 carbon atoms, at a temperature of from about 80° C. to about 150° C., in a proportion of isoalkylaluminum to 1,3-butadiene providing an excess over one-third mole of isoalkylaluminum per mole of 1,3-butadiene during the reaction, and while removing the isoolefin formed as a by-product from the resulting mixture, for a period of time sufficient to produce a polymer composed in substantial proportion of recurring units of the formula:

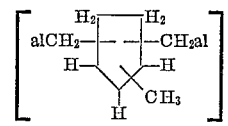

(b) bringing said polymer into reactive admixture with at least 1.5 moles of ethylene per aluminum atom of said polymer, in the absence of a catalyst, at a temperature of from about 80° C. to about 190° C., for a period of time sufficient to produce an ethylenically grown polymer composed in substantial proportion of recurring units of the formula:

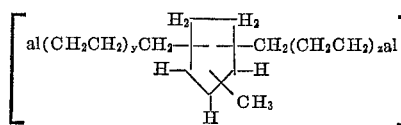

wherein y and z designate integers of from 0 to 8, at least one of which is a positive integer; and (c) bringing said ethylenically grown polymer into reactive admixture with at least 3 moles of ethylene per aluminum atom of said ethylenically grown polymer, in contact with a catalytic amount of a metal catalyst selected from the group consisting of nickel, platinum, and cobalt, at a temperature of from about 25° C. to about 120° C., for a period of time sufficient to produce said di(ω-alkenyl)methylcyclopentane.

5. The process for the production of a di(ω-alkenyl)methylcyclopentane of the formula selected from the group:

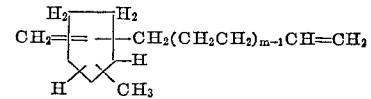
and
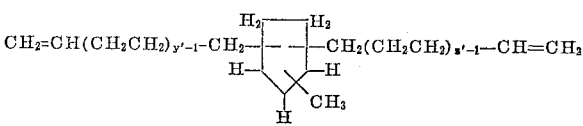

wherein m, y' and z' designate integers of from 1 to 8, and wherein the double bond attached directly to the cyclopentane nucleus is attached to a single carbon atom thereof, which process comprises the steps of (a) bringing 1,3-butadiene into reactive admixture, with an isoalkylaluminum of the formula:

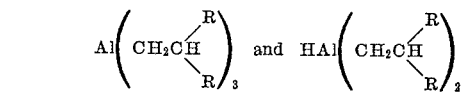

wherein each R, independently, designates an alkyl radical of from 1 to 4 carbon atoms, at a temperature of from about 90° C. to about 130° C., in a proportion of isoalkylaluminum to 1,3-butadiene providing an excess over one-third mole of isoalkylaluminum per mole of 1,3-butadiene during the reaction, and while removing the isoolefin formed as a by-product from the resulting mixture, for a period of time sufficient to produce a polymer composed in substantial proportion of recurring units of the formula:

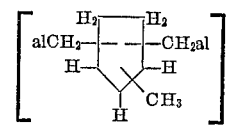

(b) bringing said polymer into reactive admixture with at least 1.5 moles of ethylene per aluminum atom of said polymer, in the absence of a catalyst, at a temperature of from about 85° C. to about 120° C., for a period of time sufficient to produce an ethylenically grown polymer composed in substantial proportion of recurring units of the formula:

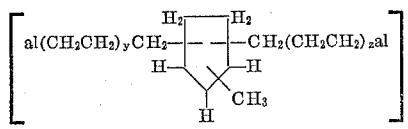

wherein $y$ and $z$ designate integers of from 0 to 8, at least one of which is a positive integer; and (c) bringing said ethylenically grown polymer into reactive admixture with at least 3 moles of ethylene per aluminum atom of said ethylenically grown polymer, in contact with a catalytic amount of nickel acetylacetonate, at a temperature of from about 40° C. to about 70° C., for a period of time sufficient to produce said di(ω-alkenyl)methylcyclopentane.

6. The process according to claim 5 wherein said isoalkylaluminum is triisobutylaluminum.

7. The di(ω-alkenyl)methylcyclopentane of the formula:

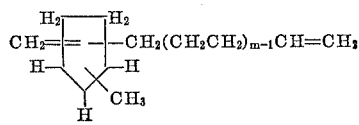

wherein $m$ is a value of from 3 to 8.

8. The di(ω-alkenyl)methylcyclopentane of the formula:

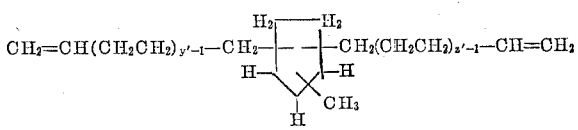

wherein $y'$ and $z'$ are positive values of from 1 to 8, the sum of which is a value of at least 3.

References Cited
UNITED STATES PATENTS 3,154,594   10/1964   Levine _____ 260—666

OTHER REFERENCES

A. T. Blomquist et al.: J. Amer. Chem. Soc., 78, pp. 6057–63, 1956.

DELBERT E. GANTZ, *Primary Examiner.*

V. O'KEEFE, *Assistant Examiner.*

UNITED STATES PATENT OFFICE
CERTIFICATE OF CORRECTION

Patent No. 3,391,209     Dated July 2, 1968

Inventor(s) Erich Marcus

It is certified that error appears in the above-identified patent and that said Letters Patent are hereby corrected as shown below:

Column 1, line 33, that portion of the formula "$CH-CH_2$" should read --$CH=CH_2$--. Column 3, line 58, in the formula, change "$H_1$" to --$H_2$--; line 64, that portion of the formula "$(CH_2CH_{2z})al$" should read --$(CH_2CH_2)_z al$--. Column 6, line 15, "$+2alCH=CH_3$" should read --$+2alCH_2CH_3$--. Column 12, line 37, "introgen" should read --nitrogen--. Column 15, line 52, that portion of the formula "$CH=CH$" should read --$CH=CH_2$--.

Signed and Sealed this twenty-fourth Day of February 1976

[SEAL]

Attest:

RUTH C. MASON
Attesting Officer

C. MARSHALL DANN
Commissioner of Patents and Trademarks